United States Patent [19]

Falke et al.

[11] Patent Number: 5,488,070
[45] Date of Patent: Jan. 30, 1996

[54] POLYURETHANE-BASED, COMPACT MOLDINGS OR MOLDINGS HAVING A CELLULAR CORE AND A COMPACTED SURFACE, PROCESS FOR THEIR PRODUCTION, AND THEIR USE AS SHOE OR SHOE SOLE MATERIAL

[75] Inventors: Peter Falke, Schwarzheide; Holger Seifert, Freital; Marion Heinz, Senftenberg, all of Germany

[73] Assignee: BASF Schwarzheide GmbH, Germany

[21] Appl. No.: 394,877

[22] Filed: Feb. 27, 1995

[30] Foreign Application Priority Data

Feb. 25, 1994 [DE] Germany ............... 44 06 219.2

[51] Int. Cl.⁶ ............................................. C08J 9/34
[52] U.S. Cl. ............................................. 521/51; 521/137
[58] Field of Search ........................... 521/51, 137

[56] References Cited

U.S. PATENT DOCUMENTS 5,260,343  11/1993  Harrison et al. .................. 521/51
5,389,693   2/1995  DeGenova et al. ............... 521/51

*Primary Examiner*—Morton Foelak
*Attorney, Agent, or Firm*—Dennis V. Carmen

[57] ABSTRACT

The invention relates to polyurethane-based, compact moldings or moldings having a cellular core and a compacted surface which comprise crosslinked poly(meth)acrylic acid, poly(meth)acrylic acid salts and/or poly(meth)acrylamides, to a process for their production, and to their use as shoe or shoe sole material.

4 Claims, No Drawings

POLYURETHANE-BASED, COMPACT MOLDINGS OR MOLDINGS HAVING A CELLULAR CORE AND A COMPACTED SURFACE, PROCESS FOR THEIR PRODUCTION, AND THEIR USE AS SHOE OR SHOE SOLE MATERIAL

The invention relates to polyurethane-based, compact moldings or moldings having a cellular core and a compacted surface, and to a process for their production by reacting a) organic and/or modified organic polyisocyanates with b) at least one relatively high-molecular-weight polyhydroxyl compound and, if desired, c) low-molecular-weight chain extenders and/or crosslinking agents, in the presence of d) a polyermic additive and e) if desired, blowing agents, f) catalysts and g) if desired, further additives and/or auxiliaries.

The invention furthermore relates to the use of these moldings as shoe or shoe sole material.

The preparation of cellular and noncellular, polyurethane-based plastics by reacting organic polyisocyanates with organic polyhydroxyl compounds in the presence of catalysts and, if desired, chain extenders and/or crosslinking agents and blowing agents, auxiliaries and/or additives is known. A suitable choice of hydroxyl-containing polyesters, polyethers, polyester-amides, inter alia, and organic polyisocyanates and the additional use of chain extenders, for example glycols, trihydric alcohols and/or diamines allows this method to be used for the preparation of both elastic and rigid, cellular and noncellular polyurethane plastics and all modifications in between.

The preparation of polyurethane plastics, their mechanical properties and their uses are described, for example, in the monographs High Polymers, Volume XVI, "Polyurethanes", Parts I and II, by I. H. Saunders and K. C. Frisch (Interscience Publishers, New York, 1962 and 1964 respectively) and Kunststoff-Handbuch, Volume VII, Polyurethane, 1966 and 1983, by Dr. R. Vieweg and Dr. A. Höchtlen, and Dr. G. Oertel respectively (Carl-Hanser-Verlag, Munich).

Polyurethane-based, compact moldings or moldings having a cellular core and a compacted surface and their production have likewise been described in many patent publications (for example DE-A 19 30 539, DE-A 22 54 912, DE-A 31 33 859, EP-A 60 240, EP-A 17 928, EP-A 44 481, EP-A 69 286, GB-A 1,365,215, U.S. Pat. No. 4,065,410, U.S. Pat. No. 4,218,543, U.S. Pat. No. 3,726,952, U.S. Pat. No. 4,033,912, U.S. Pat. No. 4,024,090, U.S. Pat. No. 4,058,492 and U.S. Pat. No. 4,098,731).

In this connection, polyurethane-based moldings are taken to be not only pure polyurethane plastic moldings, as obtained by reacting organic polyisocyanates with organic polyhydroxyl compounds, but also those during whose production some of the isocyanate groups have already been reacted through carbodiimide, uretoneimine, isocyanurate, allophanate, biuret and/or uretdione formation and/or with amino- and/or mercapto-containing reactants. Polyurethane-based moldings can be produced in flexible, semirigid and rigid modifications.

Moldings having a preferably integral density distribution have been used for many years, inter alia for the production of shoe soles. A disadvantage of these plastics, in particular if they have a low molding density or have preferably been blown using water, is a low property level and a poor integral distribution of the density in the molding. There is thus a demand for polyurethane-based, compact moldings or moldings having a cellular core and a compacted surface, in particular those having a semirigid modification, as used as shoe soles, to be correspondingly modified in order to overcome said disadvantages.

It is known that polyurethanes can be modified, for example, by means of polystyrene and/or polyacrylonitrile, but, in particular, the absence of a water absorption capacity has an adverse effect. Also known are modifications with amorphous silicic acids, but these generally form a sediment. In all these cases, the additives have an adverse effect on the property profile of the moldings produced on this basis and make them unsuitable for the desired applications.

It is an object of the present invention to provide novel polyurethane-based moldings which, correspondingly modified, satisfy the demands for an improved property profile and a good integral density distribution without the modification having an adverse effect on the application properties of the plastics.

We have found that, surprisingly, this object is achieved by adding a polymeric poly(meth)acrylate-based additive to the polyurethane moldings.

The present invention accordingly provides polyurethane-based, compact moldings or moldings having a cellular core and a compacted surface which comprise crosslinked poly(meth)acrylic acid, poly(meth)acrylic acid salts and/or poly(meth)acrylamides.

The present invention furthermore provides a process for the production of polyurethane-based, compact moldings or moldings having a cellular core and a compacted surface, by reacting a) organic and/or modified organic polyisocyanates with b) at least one relatively high-molecular-weight polyhydroxyl compound and, if desired, c) low-molecular-weight chain extenders and/or crosslinking agents, in the presence of d) a polymeric additive and e) if desired, blowing agents, f) catalysts and g) if desired, further additives and/or auxiliaries, wherein the polymeric additive d) is crosslinked poly(meth)acrylic acid, poly(meth)acrylic acid salts and/or poly(meth)acrylamides in an amount of from 0.01 to 15% by weight, preferably from 0.1 to 8% by weight, based on the total weight of the reaction mixture.

The present invention furthermore provides the use of these polyurethane-based, compact moldings or moldings having a cellular core and a compacted surface as shoe or shoe sole material.

The novel moldings prove to be particularly suitable for this area of application. Surprisingly, it has been found that addition of poly(meth)acrylic acids, poly(meth)acrylic acid salts and/or poly(meth)acrylamides, which were hitherto not conventional in the preparation and processing of polyurethanes, cause a significant improvement in the property profile of the moldings, in particular with respect to the integral density distribution.

The following details apply to the novel moldings and their formative components a) to g):

a) Suitable organic polyisocyanates (a) are aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl- 5-isocyanatomethylcyclohexane (isophere diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, araliphatic diisocyanates, eg. 1,4-xylylene diisocyanate and isomer mixtures thereof, and preferably aromatic diisocyanates and polyisocyanates, eg. 2,4- and 2,6-tolylene diisocyanate and the corresponding isomer mixtures, 4,4'-, 2,4'- and 2,2'-diphenylmethane diisocyanate (MDI) and the corresponding isomer mixtures, mixtures of 4,4'- and 2,4'-diphenylmethane diisocyanates, polyphenol-polymethylene polyisocyanates, mixtures of 4,4'-, 2,4'- and 2,2-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products which are obtained by chemical reaction of organic diisocyanates and/or polyisocyanates. Specific examples are ester-, urea-, biuret-, allophanate-, carbodiimide-, isocyanurate-, uretdione-, uretonimine-, and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate modified by means of low-molecular-weight diols, triols, dialkylene glycols, trialkylene glycols or polyoxyalkylene glycols having molecular weights of up to 4200, mixtures of 4,4'- and 2,4'-diphenylmethane diisocyanates or 2,4- or 2,6-tolylene diisocyanates, specific examples of di- and polyoxyalkylene glycols, which can be employed individually or as mixtures, being diethylene glycol, dipropylene glycol, polyoxyethylene glycol, polyoxypropylene glycol and polyoxypropylene-polyoxyethylene glycol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, eg. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, eg. 2,4'- or 4,4'-diphenylmethane diisocyanate, crude MDI or 2,4- and/or 2,6-tolylene diisocyanate. Very highly suitable are, for example, mixtures of urethane-modified diphenylmethane diisocyanates and/or tolylene diisocyanates and/or crude MDI and modified or unmodified diphenylmethane diisocyanates and/or tolylene diisocyanates and/or crude MDI.

Organic polyisocyanates which have proven particularly successful and are therefore preferred for use in the production of the novel polyurethane moldings are:

Polyisocyanates containing aromatically bonded isocyanate groups and having a mean NCO functionality of from 2 to 3. The particularly preferred isocyanates include room-temperature-liquid polyisocyanates or polyisocyanate mixtures from the diphenylmethane series, ie. room-temperature-liquid mixtures of 4,4'-diphenylmethane diisocyanate with 2,4'-diphenylmethane diisocyanates, room-temperature-liquid carbodiimide- or uretoneimine-modified derivatives of these isocyanates, and room-temperature-liquid products of the reaction of these isocyanates with polyols. These semi-prepolymers are reaction products having an NCO/OH equivalent ratio of from 2.2:1 to 20:1.

b) The relatively high-molecular-weight polyhydroxyl compounds (b) are expediently those having a functionality of from 2 to 8, and a mean molecular weight of from 400 to 12,000. Particular success has been achieved using polyols selected from the group comprising the polyether-polyols, polyester-polyols, polythioether-polyols, hydroxyl-containing polyesteramides, hydroxyl-containing polyacetals, hydroxyl-containing aliphatic polycarbonates and polymer-modified polyether-polyols, or mixtures of at least two of said polyols. Particular preference is given to polyester-polyols and/or polyetherpolyols.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid mono- and/or diesters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols and alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane and pentaerythritol. Preference is given to ethanediol, diethylene glycol, 1,4-butanediol, 1,5-pentanediol, 1,6-hexanediol, glycerol and mixtures of at least two of said diols, in particular mixtures of 1,4-butanediol, 1,5-pentanediol and 1,6-hexanediol and/or glycerol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, eg. aromatic and preferably aliphatic polycarboxylic acids and/or derivatives thereof and polyhydric alcohols without using a catalyst or preferably in the presence of an esterification catalyst, expediently in an inert gas atmosphere, eg. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, eg. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3, in particular from 2 to 2.6, and a mean molecular weight of from 400 to 8000, preferably from 600 to 4000.

Suitable polyether-polyols are those prepared by conventional processes, for example by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably 2 or 3, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, eg. ethanolamine, N-alkylalkanolamines, eg. N-methyl- and N-ethyl-ethanolamine, dialkanolamines, eg. diethanolamine, N-alkyldialkanolamines for example N-methyl- and N-ethyldiethanolamine, and trialkanolamines, eg. triethanolamine, and ammonia. Preference is given to polyhydric alcohols, in particular dihydric and/or trihydric alcohols and/or dialkylene glycols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or mixtures of at least two polyhydric alcohols and, if desired, water.

The polyether-polyols, preferably polyoxypropylene- and polyoxypropylene-polyoxyethylene-polyols, advantageously have a functionality of from 2 to 8 and mean molecular weights of from 800 to 12,000, preferably from 1000 to 6000, and expediently contain less than 10 ppm of alkali metal ions.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyetherpolyol dispersions which contain, as the disperse phase, usually in an amount of from 1 to 50% by weight, preferably from 2 to 25% by weight, for example mineral fillers, polyureas, polyhydrazides, polyurethanes containing tertiary amino groups in bound form, and/or melamine and are described, for example, in EP-A-011 752 (CA 1,166,403), EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the polymer-modified polyether-polyols or polyester-polyols and the hydroxyl-containing polyesteramides, polyacetals and/or polycarbonates.

Examples of suitable hydroxyl-containing polyacetals are the compounds which can be prepared from glycols, such as diethylene glcyol, triethylene glycol, 4,4'-dihydroxyethoxy-diphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, trioxyethylene glycol or tetraoxyethylene glycol, with diaryl carbonates, eg. diphenyl carbonate, or phosgene.

The hydroxyl-containing polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

c) The polyurethane-based moldings can be produced with or without the use of chain extenders and/or crosslinking agents (c). However, it may prove advantageous, in order to modify the mechanical properties, for example the hardness, to add chain extenders, crosslinking agents or, if desired, mixtures thereof. Examples of chain extenders and/or crosslinking agents are low-molecular-weight polyhydric alcohols, preferably diols and/or triols, having a mean molecular weight of less than 480, preferably from 60 to 300. Examples are aliphatic, cycloaliphatic and/or araliphatic diols having from 2 to 14 carbon atoms, preferably from 4 to 10 carbon atoms, eg. ethylene glycol, 1,3-propanediol, 1,10-decanediol, o-, m- and p-dihydroxy-cyclohexane, diethylene glycol, triethylene glycol, dipropylene glycol, tripropylene glycol and preferably 1,3-butanediol, 1,4-butanediol, 1,6-hexanediol, bis(2-hydroxyethyl)bisphenol A and bis(2-hydroxyethyl)hydroquinone, triols, such as 1,2,4- and 1,3,5-trihydroxycyclohexane, trimethylolethane, glycerol and trimethylolpropane, and hydroxyl-containing polyalkylene oxides, eg. having a mean molecular weight of up to 2500, preferably from 130 to 850, based on ethylene oxide and/or 1,2-propylene oxide, and the initiator molecules mentioned above for the preparation of polyether-polyols. Propoxylated bisphenol A, for example having a mean molecular weight of from 300 to 1100, is also highly suitable.

Other suitable chain extenders are N,N'-dialkyl-substituted aromatic diamines, which are unsubstituted or substituted on the aromatic radical by alkyl groups, having 1 to 20, preferably 1 to 4, carbon atoms in the N-alkyl radical, eg. N,N'-diethyl-, N,N'-di-sec-pentyl-, N,N'-di-sec-hexyl-, N,N'-di-sec-decyl- and N,N'-dicyclohexyl-, p- and m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

Other crosslinking agents (c) which have proven highly suitable are polyether-polyols having an alkali metal ion content of up to 1200 ppm, preferably those having a mean functionality of from 2 to 8, a hydroxyl number of from 200 to 1240 and a content of alkali metal ions, preferably potassium ions, of from 150 to 1000 ppm. Polyether-polyols having such an alkali metal ion content can, for example, be prepared directly by using alkali metal hydroxides or alkoxides as alkoxylation catalysts or, preferably, commercially available polyetherpolyols, which usually have an alkali metal ion content of less than 10 ppm, can be treated with aqueous alkali metal hydroxide, preferably an aqueous potassium hydroxide solution, or a alcoholic alkali metal alkoxide solutions, preferably alcoholic potassium alkoxide solutions, in the necessary amounts at room temperature or elevated temperature, for example at from 20° to 120° C. The added and formed water or the alcohol is then removed by distillation at from 70° to 110° C., at atmospheric pressure or under reduced pressure, for example at from 0.01 to 1 mbar.

Highly successful crosslinking agents having a high alkali metal ion content are polyether-polyols, for example, trimethylolpropane-initiated polyoxyethylene-polyols having a hydroxyl number in the range from 630 to 970 and an alkali metal ion content, preferably a potassium ion content, of from 400 to 600 ppm, and glycerol- or trimethylolpropane- or glycerol/trimethylolpropane mixture-initiated polyoxypropylene-polyols having a hydroxyl number in the range from 210 to 930 and an alkali metal ion content, preferably a potassium ion content, in the range from 400 to 600 ppm. Examples of other suitable alkali metal-rich polyether-polyols are polyoxypropylene-polyols having a mean functionality of from 4 to 8, preferably from 4 to 6, and a hydroxyl number of from 230 to 500, preferably from 250 to 380, obtained using sucrose or preferably sorbitol or a mixture of sucrose and sorbitol as initiator molecules, additionally it being possible to use, as coinitiator, water, propylene glycol, glycerol or a mixture of at least two of said coinitiators, with the proviso that the polyether-polyols have an alkali metal ion content, preferably a potassium ion content, of from 200 to 1000 ppm, preferably from 400 to 700 ppm. Also suitable are polyoxypropylene-polyols and/or polyoxyethylene-polyols having an alkali metal ion content of from 150 to 800 ppm and a hydroxyl number of from 450 to 750, which can be obtained by reacting pentaerythritol or a mixture of pentaerythritol and glycerol and/or trimethylolpropane, expediently in a pentaerythritol: glycerol and/or trimethylolpropane molar ratio of 1:1, with 1,2-propylene oxide or ethylene oxide.

If the compounds of component (c) are used, they can be employed in the form of mixtures or individually and are advantageously used in amounts of from 1 to 50 parts by weight, preferably from 3 to 20 parts by weight, based on 100 parts by weight of the relatively high-molecular-weight compounds (b).

d) The novel moldings are produced using, as polymeric additive (d), crosslinked polyacrylic acid or salts and/or amides thereof, and/or polymethacrylic acid or salts and/or amides thereof.

The polyacrylic acid or polymethacrylic acid salts used are preferably those of alkali and/or alkaline earth metals, very particularly preferably sodium and/or potassium salts.

The polyacrylamides or polymethacrylamides used are preferably those containing free NH groups, very particularly preferably polyacrylamide.

In the polymeric additive (d), the individual polyacrylic and/or polymethacrylic constituents can, according to the invention, be employed alone or in combination with one another, ie. one or more poly(meth)acrylic acids and/or one or more poly(meth)acrylic acid salts and/or one or more poly(meth)acrylamides.

The crosslinking of the acrylic acid polymers or methacrylic acid polymers is carried out by means of at least difunctional crosslinking agents, as described under c). In particular, polyols, aminoalcohols and polyamines are employed. The crosslinking is achieved principally by conversion of the acid groups in the acrylic acid polymers or methacrylic acid polymers into ester and/or amide groups.

The crosslinking can also be effected by carrying out the polymerization reaction for the preparation of the poly(meth)acrylic acids, poly(meth)acrylic acid salts or poly(meth)acrylamides in the presence of compounds containing 2 or more ethylenically unsaturated, polymerizable bonds, in particular difunctional or polyfunctional monomers, for example diacrylates or dimethacrylates.

For example, di- and tri(meth)acrylates of ethylene glycol, diethylene glycol, triethylene glycol, polyethylene glycols, 1,2-propanediol, 1,3-propanediol, polypropylene glycols, 2,2-dimethylpropanediol, 1,4-butanediol, 1,1,1-trimethylolpropane or glycerol, are used.

In a particularly advantageous and preferred embodiment of the invention, a mixture of polyacrylic acid and sodium polyacrylate, crosslinked as described above, is used.

Such crosslinked poly(meth)acrylic acids, poly(meth)acrylic acid salts and/or poly(meth)acrylamides are commercially available, for example under the trade names Aqualic® and Luquasorb® from BASF Aktiengesellschaft, or otherwise can be prepared by conventional methods.

The polymeric additive (d) is employed in an amount of from 0.01 to 15% by weight, preferably from 0.1 to 8% by weight, based on the total amount of reaction mixture.

e) Any blowing agent (e) used is preferably water, which reacts with the organic, modified or unmodified polyisocyanates (a) to form carbon dioxide and urea groups and thereby affects the compressive strength of the end products. The water is usually used in amounts of from 0.05 to 6% by weight, preferably from 0.1 to 4% by weight, in particular 0.15 to 2.5% by weight, based on the weight of formative components (a), (b) and, if used, (c).

Any blowing agent (e) if used may, instead of water, or preferably in combination with water, also be a low-boiling liquid which evaporates under the influence of the exothermic polyaddition reaction and advantageously has a boiling point at atmospheric pressure in the range from −40° to 120° C., preferably from 10° to 90° C., or a gas.

The liquids of the abovementioned type and the gases which are suitable as blowing agents can be selected, for example, from the group comprising the alkanes, advantageously having 3 to 5 carbon atoms, eg. propane, n- and isobutane, n- and isopentane and preferably technical-grade pentane mixtures, cycloalkanes, advantageously having 4 to 6 carbon atoms, eg. cyclobutane, cyclopentene, cyclohexene and preferably cyclopentane and/or cyclohexane, dialkyl ethers, eg. dimethyl ether, methyl ethyl ether or diethyl ether, cycloalkylene ethers, eg. furan, ketones, eg. acetone and methyl ethyl ketone, carboxylates, such as methyl formate, silanes, eg. tetramethylsilane, fluoroalkanes, which are degraded in the troposphere and are therefore benign to the ozone layer, eg. trifluoromethane, difluoromethane, difluoroethane, tetrafluoroethane and heptafluoroethane, and gases, eg. nitrogen, carbon monoxide and noble gases, eg. helium, neon and krypton. It is also possible to use chlorofluorocarbons, for example trichlorofluoromethane or trichlorotrifluoroethane, preferably difluorochloromethane, difluorochloroethanes, advantageously 1-chloro-1,1-difluoroethane, 1,1,1-trifluoro- 2,2-dichloroethane, or mixtures of at least 2 of these blowing agents.

It is also possible to use carboxylic acids, for example formic acid and acetic acid, and tertiary alcohols, such as tertiary butanol, alone or in combination with the other blowing agents.

The most expedient amount of low-boiling liquid and gas, which may in each case be employed individually or as liquid or gas mixtures or as gas/liquid mixtures, depends on the density desired and on the amount of water employed. The amounts necessary can easily be determined by simple preliminary experiments. Satisfactory results are usually given by amounts of from 0.5 to 20 parts by weight, preferably from 2 to 10 parts by weight, of liquid and from 0.01 to 30 parts by weight, preferably from 2 to 20 parts by weight, of gas, in each case based on 100 parts by weight of components (a), (b) and, if used, (c) and (d).

f) The catalysts (f) used to produce the moldings having a compacted peripheral zone and a cellular core are, in particular, compounds which greatly accelerate the reaction of the hydroxyl-containing compounds of component (b) and, if used, (c) with the organic, modified or unmodified polyisocyanates (a). Suitable compounds are organometallic compounds, preferably organotin compounds, such as tin(II) salts of organic. carboxylic acids, eg. tin(II) diacetate, tin(II) dioctanoate, tin(II) diethylhexanoate and tin(II) dilaurate, and dialkyltin(IV) salts of organic carboxylic acids, eg. dibutyltin diacetate, dibutyltin dilaurate, dibutyltin maleate and dioctyltin diacetate. The organometallic compounds can be employed alone or preferably in combination with highly basic amines. Examples which may be mentioned are amidines, such as 2,3-dimethyl-3,4,5,6-tetrahydropyrimidine, diazobicycloundecane, tertiary amines, such as triethylamine, tributylamine, dimethylbenzylamine, N-methyl-, N-ethyl-, N-cyclohexylmorpholine, N,N,N',N'-tetramethylethylene-diamine, N,N,N',N'-tetramethylbutanediamine, pentamethyldiethylenetriamine, tetramethyldiaminoethyl ether, bis(dimethylaminopropyl)urea, dimethylpiperazine, 1,2-dimethylimidazole, 1-aza-bicyclo[ 3.3.0]octane, and, preferably, 1,4-diazabicyclo[2.2.2]octane and alkanolamine compounds such as triethanolamine, triisopropanolamine, N-methyl- and N-ethyldiethanolamine and dimethylethanolamine.

g) In addition, additives and/or auxiliaries (g) may, if desired, be used for the production of the novel moldings.

Additives and auxiliaries which may be mentioned are surfactants, foam stabilizers, cell regulators, lubricants, fillers, dyes, pigments, antistatics, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, eg. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

A particularly successful lubricant is a ricinoleic acid polyester having a molecular weight of from 1500 to 3500, preferably from 2000 to 3000, which is expediently employed in an amount of from 0.5 to 10% by weight, preferably from 5 to 8% by weight, based on the weight of component (b) or of components (b) and (c).

For the purposes of the present invention, fillers, in particular reinforcing fillers, are conventional organic and inorganic fillers, reinforcing agents, weighting agents, agents for improving the abrasion behavior of paints, coating compositions etc known per se. Specific examples are inorganic fillers, such as silicate minerals, for example phyllosilicates, such as antigorite, serpentine, hornblends, amphiboles, chrysotile, talc; metal oxides, such as kaolin, aluminum oxides, aluminium silicate, titanium oxides and iron oxides, metal salts, such as chalk, baryte and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl) ethylene diphosphate.

In addition to the abovementioned halogen-substituted phosphates, it is also possible to use inorganic flameproofing agents, such as red phosphorus, expandable graphite, aluminum oxide hydrate, antimony trioxide, arsenic oxide, ammonium polyphosphate and calcium sulfate, or cyanuric acid derivatives, eg. melamine, or mixtures of two or more flameproofing agents, eg. expandable graphite and ammonium polyphosphate, expandable graphite, melamine and ammonium polyphosphate, ammonium polyphosphates and melamine, and also, if desired, starch, in order to flameproof the moldings produced according to the invention. In general, it has proven expedient to use from 2 to 40 parts by weight, preferably from 5 to 25 parts by weight, of said flameproofing agents or mixtures per 100 parts by weight of components (a) to (c).

Further details on the other conventional assistants and additives mentioned above can be obtained from the specialist literature, for example from the monograph by J. H. Saunders and K. C. Frisch in High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983.

To produce the novel moldings, the organic modified or unmodified polyisocyanates (a), the relatively high-molecular-weight polyhydroxyl compounds (b) and, if used, the low-molecular-weight chain extenders and/or crosslinking agents (c) are reacted in such amounts that the equivalence ratio between the NCO groups of the polyisocyanates (a) and the total number of reactive hydrogen atoms of the remaining components is from 1:0.3 to 1:2, preferably 1:0.4 to 1:1.7, in particular from 1:0.9 to 1:1.1.

The moldings can be produced by known methods, for example the prepolymer method, the semi-prepolymer method or the one-shot process using the high-pressure method or preferably the low-pressure method expediently in a closed, heatable mold, for example a metallic mold, eg. made of aluminum, cast iron or steel, or a mold made from a fiber-reinforced polyester or epoxy molding material. Low-viscosity, readily flowable and therefore more readily processable formulations can also be converted into moldings with the aid of reaction injection molding (RIM).

These procedures are described, for example, by Piechota and Röhr in Integralschaumstoffe, Carl-Hanser-Verlag, Munich, Vienna, 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in the Kunststoff-Handbuch, Volume 7, Polyurethane, 2nd Edition, 1983, pages 333 ff.

In the novel process, formative components (a) to (e) are preferably reacted by the one-shot method in closed molds, A plurality of reaction components, preferably 2 or 3, are used here, where the polyisocyanate component (a) generally forms one and the other formative components (b) to (e) form one or more reaction components.

It has proven particularly advantageous to use the two-component method and to combine components (b), (d), (f) and, if used, (c), (e) and (g) in component (A) and to use the organic polyisocyanate, the modified polyisocyanate (a) or the mixture of said polyisocyanates and, if desired, the blowing agent (e) as component (B).

The polymeric additive (d) is introduced into and dispersed in component (A) by stirring or trituration in a conventional manner. However, it can also be introduced as the third component in addition to components (A) and (B). In principle, it is also possible to prepare an NCO-terminated prepolymer from component (a) and some of the components (b) and/or (c) and to react this in a second reaction step, as described above, the novel polymeric additive (d) being a constituent of the hydroxyl-terminated component.

The starting components are mixed at from 15° to 100° C., preferably at from 25° to 55° C., and introduced into the open or closed mold at atmospheric pressure or superatmospheric pressure. The mixing can be carried out mechanically by means of a stirrer or a stirring screw or under high pressure by the countercurrent injection method. The mold temperature is expediently from 10° to 140° C., preferably from 20° to 80° C.

After a mold hold time of from 0.5 to 10 min, preferably from 1 to 5 min, moldings generally having a homogeneous, substantially defect-free surface are demolded.

The amount of reaction mixture introduced into the mold is advantageously such that the polyurethane-based moldings obtained have a density of from 100 to 1400 g/l, preferably from 200 to 700 g/l, and a Shore A hardness of from 40 to 80, measured in accordance with DIN 53 505.

Polyurethane plastics of this type represent particularly valuable raw materials for the shoe industry. They are preferably used as shoe cores or soles. These shoe cores or soles can be obtained from a sheet-like material produced according to the invention, for example by cutting or stamping. However, shoe soles are preferably produced as molded soles using appropriate molds and subsequently bonded or sewn to the upper material (cleats). It is also generally conventional to introduce the upper material (cleats) into the mold as an edge, giving shoe soles foamed directly onto the shoe upper material.

EXAMPLES

Example 1 based on a polyetherol system comprising a
component A comprising 58.7% by weight of polyoxypropylene-oxyethylene block copolyetherdiol, OH number: 29

27% by weight of polyoxypropylene-oxyethylene block copolyethertriol, OH number: 35

10% by weight of 1,4-butanediol 1.5% by weight of ethylene glycol 1.85% by weight of 1,4-diazabicyclo[2.2.2]octane 0.45% by weight of water 0.5% by weight of silicone and a component B comprising polyisocyanate prepolymer based on 65% by weight of 4,4'-MDI 7% by weight of carbodiimide-modified 4,4'-MDI 27% by weight of polyoxypropylene-oxyethylene block copolyetherdiol, OH number: 30

1% by weight of castor oil

Components A and B were processed under the following parameters, where component A was in each case modified by means of the additives shown in Table 1:

Component temperature: 25° C.

Mold temperature: 45° C.

Mixing ratio: 100:66 (component A:B)

Viscosity;
  comp. A: 800 mPas (25° C.)
  comp. B: 200 mPas (25° C.)

Component B: 23% of NCO

Density: 500 g/l

TABLE 1

|  | Ex. 1a (for comp.) | Ex. 1b (acc. to inv.) | Ex. 1c (acc. to inv.) |
| --- | --- | --- | --- |
| Product 1 | 0 | 0.45* | 0 |
| Product 2 | 0 | 0 | 0.45* |

Product 1: crosslinked sodium polyacrylate
Product 2: Copolymer comprising 89% by weight of sodium acrylate, 10% by weight of acrylic acid and 1% by weight of polyethylene glycol diacrylate
*Parts by weight, based on 100 parts by weight of components A and B Product 1: crosslinked sodium polyacrylate Product 2: Copolymer comprising 89% by weight of sodium acrylate, 10% by weight of acrylic acid and 1% by weight of polyethylene glycol diacrylate

*Parts by weight, based on 100 parts by weight of components A and B

The moldings produced had the properties shown in Table 2:

TABLE 2

|  | Ex. 1a | Ex. 1b | Ex. 1c | DIN |
| --- | --- | --- | --- | --- |
| Elongation at break (%) | 250 | 300 | 310 | 53 504 |
| Tensile strength (MPa) | 3.0 | 3.5 | 3.6 | 53 504 |
| Tear propagation strength (N/mm) | 5.0 | 6.0 | 5.9 | 53 507 |
| Abrasion (mg) | 110 | 150 | 100 | 53 516 |
| Hardness, Shore A | 50 | 50 | 50 |  |

Example 2 based on a polyetherol system comprising a
component A comprising

59% by weight of polyoxypropylene-oxyethylene block copolyetherdiol, OH number: 29

22.5% by weight of polyoxypropylene-oxyethylene block copolyethertriol, OH number: 35

5.0% by weight of polyoxypropylene-oxyethylene block copolyethertriol, filled with 15% of silicate 10% by weight of 1,4-butanediol
1.5% by weight of ethylene glycol
0.75% by weight of 1,4-diazabicyclo [2.2.2]octane
0.3% by weight of triethanolamine
0.5% by weight of silicone
0.45% by weight of water and a
component B
65% by weight of 4,4'-MDI
7% by weight of carbodiimide-modified 4,4'-MDI
27% by weight of polyoxypropylene-oxyethylene block copolyetherdiol, OH number: 30
1% by weight of castor oil Components A and B were processed under the following parameters, where component A was in each case modified by means of the additive shown in Table 3:

Component temperature: 25° C.
Mold temperature: 50° C.
Mixing ratio: 100:63 (component A:B)
Viscosity;
  comp. A: 800 mPas (25° C.)
  comp. B: 200 mPas (25° C.)
Component B: 23% of NCO
Density: 530 g/l

TABLE 3

|  | Ex. 2a (for comp.) | Ex. 2b (acc. to inv.) |
|---|---|---|
| Product 1 | 0 | 0.45* |

*Parts by weight, based on 100 parts by weight of components A and B

The moldings produced had the properties shown in Table 4:

TABLE 4

|  | Ex. 2a | Ex. 2b | DIN |
|---|---|---|---|
| Elongation at break (%) | 280 | 350 | 53 504 |
| Tensile strength (MPa) | 3.5 | 4.5 | 53 504 |
| Tear propagation strength (N/mm) | 7.0 | 8.0 | 53 507 |
| Abrasion (mg) | 90 | 120 | 53 516 |
| Hardness, Shore A | 55 | 55 |  |

Example 3 based on a polyetherol system comprising a
component A comprising
  41.25% by weight of polybutylene adipate, OH number: 56
  41.25% by weight of polydiethylene glycol adipate, OH number: 42
  15% by weight of 1,4-butanediol
  1.1% by weight of 1,4-diazabicyclo[2.2.2]octane
  0.3% by weight of water and a
  component B
  69% by weight of 4,4'-MDI
  15% by weight of carbodiimide-modified 4,4'-MDI
  36% by weight of polyethylene-butylene adipate, OH number: 56

Components A and B were processed under the following parameters, where component A was in each case modified by means of the additives shown in Table 5:

Component temperature
  A: 45° C.
  B: 35° C.
Mold temperature: 45 ° C.
Mixing ratio: 100:98 (component A:B)
Viscosity;
  comp. A: 800 mPas (45° C.)
  comp. B: 700 mPas (35° C.)
Component B: 19% of NCO
Density: 600 g/l

TABLE 5

|  | Ex. 3a (for comp.) | Ex. 3b (acc. to inv.) | Ex. 2b (acc. to inv.) |
|---|---|---|---|
| Product 1 | 0 | 0.3* | 0 |
| Product 2 | 0 | 0 | 3.0* |

*Parts by weight, based on 100 parts by weight of components A and B

The moldings produced had the properties shown in Table 6:

TABLE 6

|  | Ex. 3a | Ex. 3b | Ex. 3c | DIN |
|---|---|---|---|---|
| Elongation at break (%) | 330 | 350 | 370 | 53 504 |
| Tensile strength (MPa) | 6.6 | 7.0 | 8.0 | 53 504 |
| Tear propagation strength (N/mm) | 6.5 | 7.0 | 14.0 | 53 507 |
| Abrasion (mg) | 70 | 90 | 50 | 53 516 |
| Hardness, Shore A | 65 | 65 | 65 |  |

We claim:

1. A method of making a shoe or a shoe sole material having a cellular core and a compacted surface, comprising reacting an organic and/or modified polyisocyanate with a polyhydroxyl compound in the presence of a crosslinked poly(meth) acrylic acid, poly(meth) acrylic acid salt, and/or poly(meth) acrylamide.

2. The method of claim 1, wherein the content of the acid, acid salt, and/or acrylamide is from 0.01 to 15% by weight.

3. The method of claim 2, wherein the amount is from 0.1 to 8% by weight.

4. The method of claim 3, wherein the density is from 100 to 1400 g/l.

* * * * *